United States Patent [19]
Morooka et al.

[11] Patent Number: 5,204,913
[45] Date of Patent: Apr. 20, 1993

[54] PATTERN PROCESSING SYSTEM

[75] Inventors: Hiroaki Morooka; Ken Aida; Hirokazu Watanabe, Shigeru Ando, all of Tokyo, Japan

[73] Assignee: Juki Corporation, Chofu, Japan

[21] Appl. No.: 852,935

[22] Filed: Mar. 13, 1992

Related U.S. Application Data

[63] Continuation of Ser. No. 244,831, Sep. 14, 1988, abandoned.

[30] Foreign Application Priority Data

Sep. 16, 1987 [JP] Japan ............................ 62-231636

[51] Int. Cl.$^5$ .............................................. G06K 9/32
[52] U.S. Cl. ........................................ 382/8; 364/470; 382/46
[58] Field of Search ................... 382/46, 48, 8, 44, 41; 364/470

[56] References Cited

U.S. PATENT DOCUMENTS

| | | | |
|---|---|---|---|
| 4,435,837 | 3/1984 | Abernathy | 382/41 |
| 4,558,461 | 12/1985 | Schlong | 382/9 |
| 4,612,867 | 9/1986 | Rösch et al. | |
| 4,829,446 | 5/1989 | Draney | 382/44 |
| 4,901,359 | 2/1990 | Bruder | 382/8 |
| 4,941,189 | 7/1990 | Britt | 382/46 |

FOREIGN PATENT DOCUMENTS 194171 10/1985 Japan.
111740 7/1986 Japan.

Primary Examiner—Leo H. Boudreau
Attorney, Agent, or Firm—Fitch, Even, Tabin & Flannery

[57] ABSTRACT

Disclosed is a pattern recognition apparatus in which a piece of cloth having a pattern is photographed by a camera, the resultant pixel data are stored in an image memory, the pixel data are sequentially read out along a plurality of predetermined angles, and the pattern is recognized on the basis of an addition value or a variance value in respect of the pixel data. Also provided is an apparatus for correcting the position of each piece of cloth on the basis of the result of the pattern recognition and for holding the corrected cloth in a piled state.

8 Claims, 13 Drawing Sheets

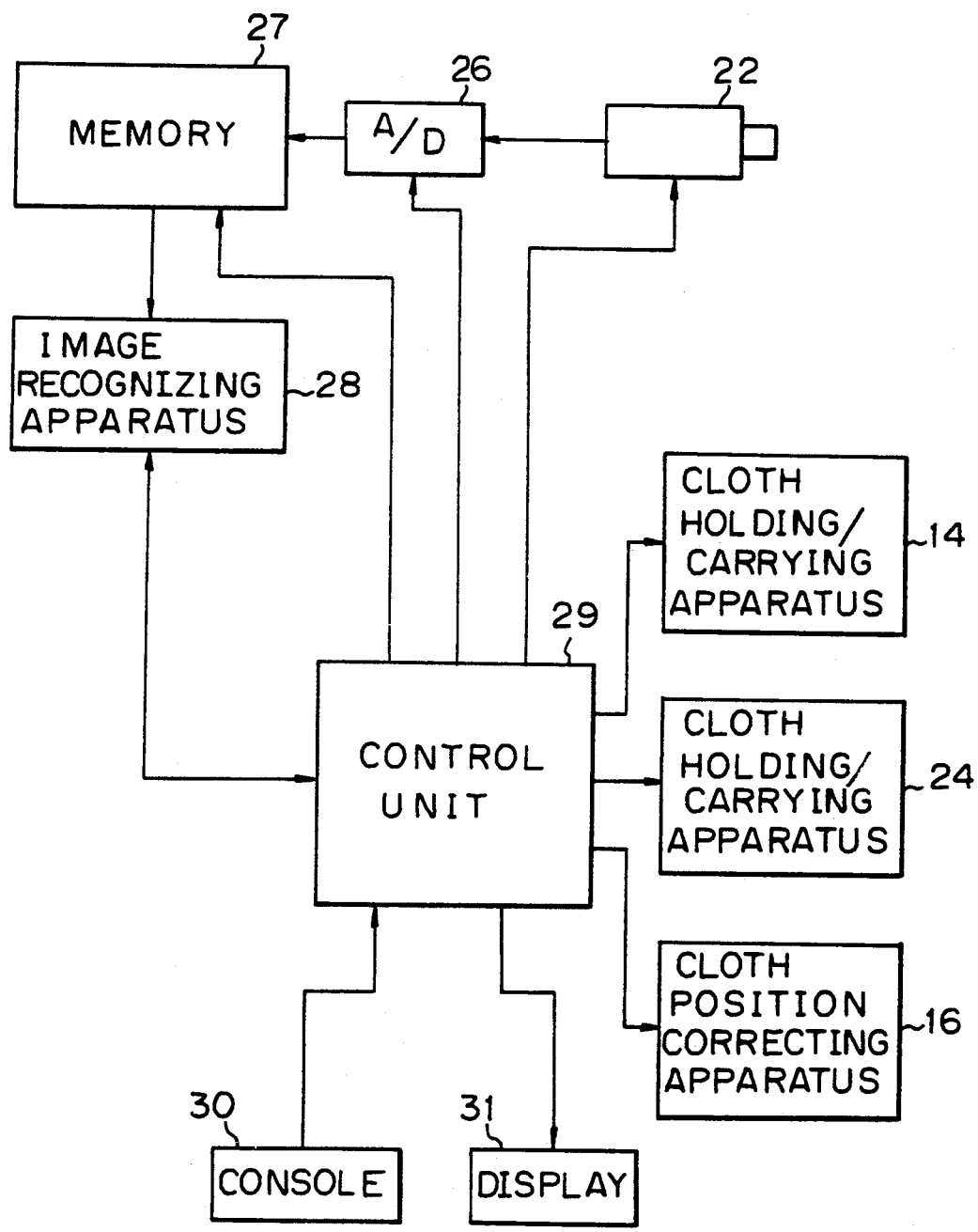

PATTERN PROCESSING SYSTEM

This application is a continuation of application Ser. No. 07/244,831 filed Sep. 14, 1988, now abandoned.

FIELD OF THE INVENTION

The present invention relates to a pattern matching apparatus for detecting the angle and position of a pattern of roughly cut cloth and for matching the pattern of this roughly cut cloth to the same position.

RELATED BACKGROUND ART

In general, it is necessary in a sewing process to match the pattern of cloth with a pattern. For example, as shown in FIG. 9A, in the case of sewing a pocket 1 onto the body of a garment 2, stripes 3 and 4 of a striped pattern or the body of a garment 2 need to be matched to the striped pattern of the pocket 1, as illustrated in FIG. 9B which shows an enlarged diagram of the portion A surrounded by a broken line in FIG. 9A. Consequently, as shown in FIG. 10, in the case of blocking pockets from pieces of cloth 7 which have been smoothed out to eliminate wrinkles by an extending and smoothing apparatus 5 and which have been laid on a Table 6, the cloth pieces 7 are cut so that the patterned stripes are located at almost the same position on blocked cloth 8. However, the stripes on the cloth pieces 7 are not always located at the same position because they are shifted in the case of the extended and smoothed pieces of cloth 7. As a result of this, the stripes on the blocked cloth pieces 7 also become out of line and it is necessary to match the patterns to correct the mismatching of the stripes on the blocked pieces of cloth 8. In order to match the patterns, a pin sticking plate 10 having pins 9 as shown in FIG. 11A is placed on the Table 6 as shown in FIG. 10 and the blocked pieces of cloth 8 are put on the pin sticking plate 10 as shown in FIG. 11C in such a manner that the cloth pieces 8 are observed one by one to ensure that the striped patterns 11 always coincide with each other such that, for example, one stripe 11 is located on a line passing through two pins as shown in FIG. 11B. The matched pieces of cloth, are finely cut to a predetermined shape, for instance, like a pocket, by a fine-cutting apparatus 12 using a fine-cutting blade 13 as shown in FIG. 12.

However, in such a pattern matching method, this work is manually performed by observing the blocked cloth pieces 8 one by one so that each stripe 11 is always located on a line passing through two pins 9, and this involves the problem that efficiency is very low.

SUMMARY OF THE INVENTION

The present invention was achieved to solve the foregoing problems and it is an object of the invention to provide a pattern processing system in which at least a part of the pattern on roughly cut cloth pieces with patterns are photographed by a camera and converted into an analog image signal, this analog image signal is then digitized into digital data and stored in a memory, the digital image data stored in the memory are output to an image recognizing apparatus, the image data are sequentially read out along the lines of a few different predetermined angles from a predetermined edge portion to the opposite edge portion of the image and added, a distribution for the maximum or minimum value of a plurality of projection data for every angle which represent the results of addition or for the mean value of a plurality of projection data is obtained, the angle and position of the pattern are detected from the maximum value of the variance obtained, and the positions of the pieces of cloth are thereby corrected.

Another object of the invention is to provide a pattern processing system in which at least a part of the pattern of an object having a zigzag pattern is photographed by a camera and converted into an image signal, this detected image signal is digitized into digital data and stored in a memory, the image data stored in the memory is read out to an image recognizing apparatus, the image data is divided into a plurality of data in a lateral direction, and the image data are sequentially read out along lines of a few different predetermined angles from a predetermined edge portion to an opposite edge portion of each of the divided image data. The image recognizing apparatus sequentially adds a plurality of read out image data, a variance for the maximum or minimum value of a plurality of projection data for every one of the angles which were added or for the mean value of a plurality of projection data is obtained, the angle and position of each of the zigzag patterns on each of the divided images are detected from the maximum value of the variance calculated, and the position of the pieces of cloth are thus connected.

Still another object of the invention is to provide a pattern processing system comprising: cloth holding and carrying means for holding and carrying roughly cut cloth pieces with a pattern; pattern image recognizing means having a camera for photographing at least a part of the pattern of each of the cloth pieces; correcting means for correcting the position of the cloth pieces the position and angle of the pattern of which were detected by the pattern image recognizing means so as to assume a predetermined position and angle; and holding and fixing means for holding the cloth pieces the position and angle of the pattern of which were corrected by the correcting means.

According to the invention, cloth pieces are conveyed one by one by the cloth holding and carrying means, each cloth pieces is photographed by the camera of the pattern image recognizing means, the resultant image signal is digitized to form digital data by an A/D converter and is stored in the image memory, the stored digital image data are read out along several different predetermined angles $\theta$ from an address $A_i$ of a predetermined position in the image memory, the read out image data are added for every read out angle, and, by comparing a plurality of product sums at every angle, it is possible to detect the position where the stripe lies and the angle of the pattern.

Meanwhile, an image is divided into a plurality of small images in the lateral direction and the image data are sequentially read out along several different predetermined angles from a predetermined edge portion to the opposite edge portion for each of the divided images and the image data read out are added. By comparing a plurality of the added values at every angle where addition was conducted, it is possible to detect the angle of each zigzag pattern and the position where the zigzag pattern lies in each of the divided images. The motor of the cloth position correcting means is driven on the basis of the correction values for the angle and position, thereby correcting the position of the cloth pieces, and the cloth pieces are thereafter placed on the holding and fixing means.

The above and other objects, features and advantages of the present invention will become apparent from the following detailed description and the appended claims with reference to the accompanying drawings.

BRIEF DESCRIPTION OF THE DRAWINGS

FIG. 2 is a block diagram of an apparatus embodying an image processing system which is used in the pattern matching apparatus of FIG. 1;

DETAILED DESCRIPTION OF PREFERRED EMBODIMENT

Figure 1:
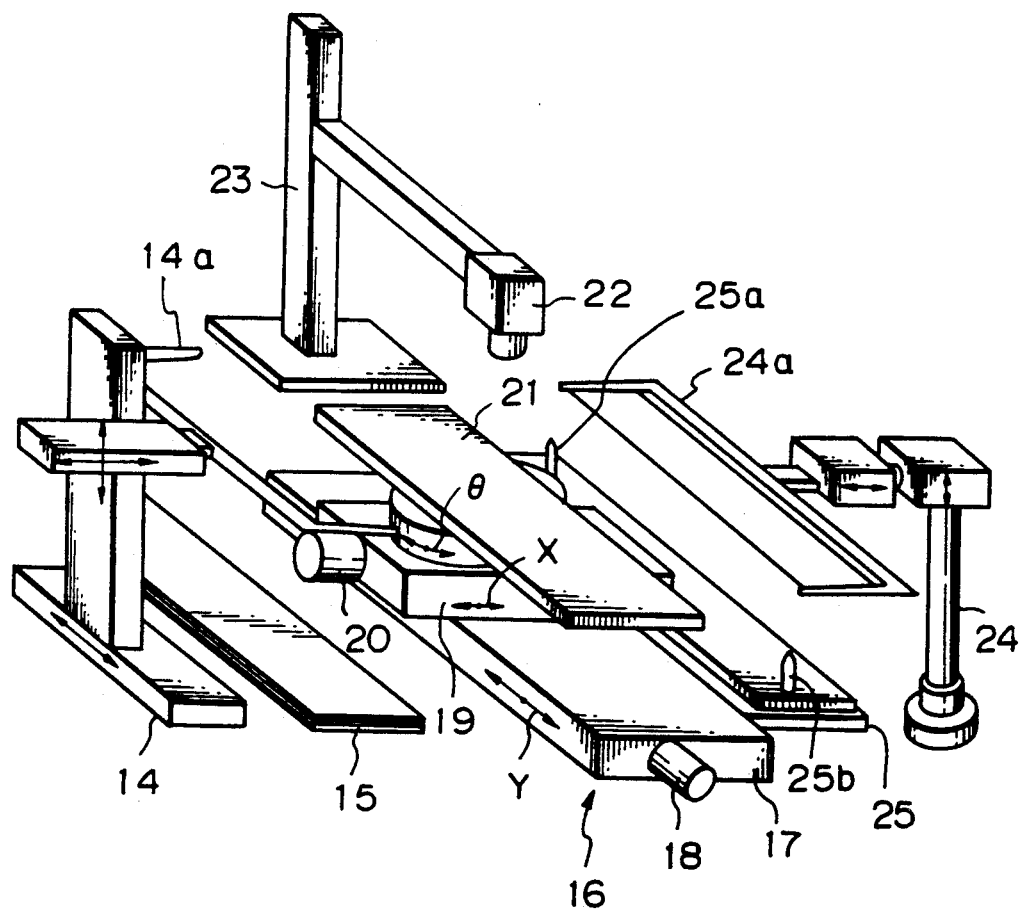
FIG. 1 is a perspective view of a pattern matching apparatus in an embodiment of the present invention.

FIG. 1 is a perspective view of a pattern matching apparatus in an embodiment of the present invention. A plurality of roughly cut cloth pieces 15 are placed in front of a cloth holding and carrying apparatus 14 having an arm 14a which is movable in three directions X, Y, and Z. A cloth position correcting apparatus 16 is provided in front of the cloth holding and carrying apparatus 14. The cloth position correcting apparatus 16 comprises a fixing base plate 17, a correcting device 19, and a mounting base 21. The correcting apparatus 16 has a motor 18 adapted to move the fixing base plate 17 in the Y direction (the forward and backward direction of a camera 22). The correcting device 19 has a motor 20 adapted to rotate the mounting base 21 in the direction $\theta$ or to move it in the direction X (alternatively, separate motors can be provided for the $\theta$ and X directions). The camera 22 adapted to photograph a striped pattern on the cloth pieces 15 which are placed on the mounting base 21 is located over the mounting base 21 and supported by a supporting frame 23. Further, a cloth holding and carrying apparatus 24 having an arm 24a which is movable in the directions X and Z is provided beside the cloth position correcting apparatus 16, thereby carrying a cloth pieces 15 which corrected its position on the mounting base 21. A holding and fixing device 25 adapted to pierce the corrected cloth pieces 15 is provided in front of the cloth holding and carrying apparatus 24.

In the pattern matching apparatus of the embodiment, the top one of the roughly cut cloth pieces 15 is placed on the mounting base 21 of the cloth position correcting device 19 by the arm 14a of the cloth holding and carrying apparatus 14 with the aid of air suction or contact with a suction pad (not shown) attached to the arm 14a. When this cloth is set on the mounting base 21, the striped pattern of the cloth 15 is photographed by the camera 22. On the basis of the striped pattern detected, the correcting device 19 and mounting base 21 are activated and moved by the motor 20 so that the striped pattern is always set to assume the same angle of inclination and the same position, thereby correcting the position of the cloth piece 15 on the mounting base 21. The corrected cloth piece 15 is conveyed by the arm 24a of the cloth holding and carrying apparatus 24 by way of suction or contact with a suction pad. This cloth piece is the pierced by pins 25a and 25b and put on the holding and fixing device 25.

As described above, according to the pattern matching apparatus of the embodiment, a cloth piece is held by the arm 14a of the cloth holding and carrying apparatus 14 and put on the mounting base 21 of the cloth position correcting device 19. Then, the striped pattern of the cloth piece 15 is automatically detected and the position of the cloth piece 15 is corrected and put on the holding and fixing device 25 without requiring any manual work, so that work efficiency is high.

FIG. 2 is a block diagram of an image processing system for continuous patterns which is used in the pattern matching apparatus incorporated in the embodiment of the invention. The pattern of an object is photographed by the camera 22 and an image signal therefrom is digitized to form a digital signal by an A/D converter 26 and is sequentially stored in an image memory 27. The digital image data stored in the image memory 27 are partially read out to an image recognition apparatus 28 in accordance with read addresses which are sent from a control unit 29 and the respective pixel data are added. The projection data (hereinafter, referred to as an addition sum value) is discriminated by the image recognizing apparatus 28, thereby determining the angle of inclination of the striped pattern on the object. The cloth holding and carrying apparatuses 14 and 24 and cloth position correcting apparatus 16 incorporating motors as drive sources are connected to the control unit 29. The control unit 29 controls the processing timing of signals in respective portions. A console 30 having a keyboard (not shown) and a display unit 31 are also connected to the control unit 29.

Figure 3A:
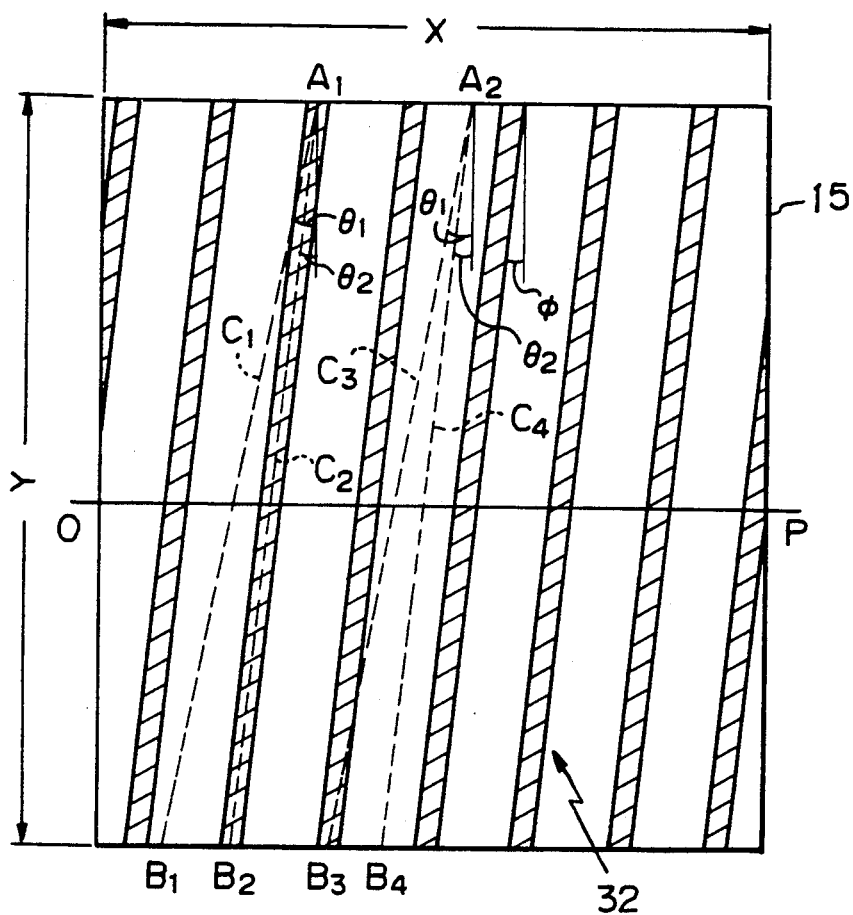
FIG. 3a is a diagram of a striped pattern on an object which is referred to in explaining the principle of the image processing system of the invention.
Figure 3B:
FIG. 3B is a diagram showing a luminance waveform along the line OP in FIG. 3A.
Figure 3C:
FIG. 3C is a diagram showing a luminance waveform at $\theta = \phi$ in FIG. 3A.
Figure 4:
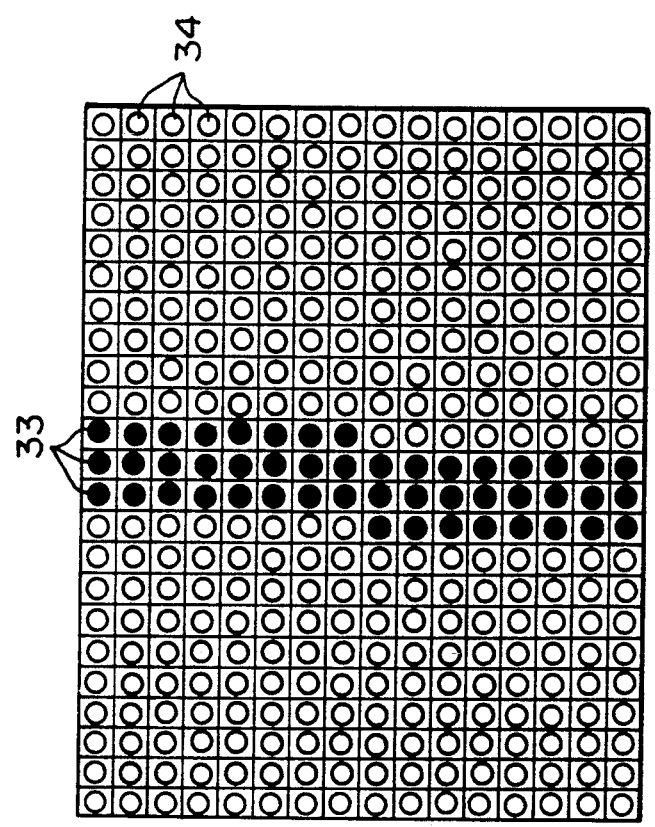
FIG. 4 is a partial diagram showing a memory state in an image memory in which the striped pattern and the other portions in FIG. 3A are stored.

The operation of the invention will now be described with reference to FIGS. 2 to 5. In FIG. 3A, it is assumed that a series of lines forming a striped pattern 32 are formed on the cloth 15. Information on a start area is output from the console 30 to the control unit 29 (step 1 in FIG. 5). The cloth 15 is photographed by the camera 22 in response to an operation control signal from the control unit 29 (step 2). This analog image data signal is digitized to form a digital signal by the A/D converter 26 (step 3). The resultant digital pixel data (indicative of luminance) are stored in the image memory 27 (step 4). FIG. 4 shows a part of the state in which this data is stored. In FIG. 4, the pixel data are stored in such a manner that black dots 33 indicate the pixel data of a stripe on the striped pattern 32 and white dots 34 represent the pixel data of the blank portions between the stripes. It is now assumed that binary values are constituted by the white dots 34 and black dots 33 and the white dots 34 are set to have a binary value of "1" and the black dots 33 a binary value of "0". In this example, the cloth 15 shown in FIG. 3A is photographed by the camera 22 and the detected image data is divided into (100×100) pixels (that is, X=100 and Y=100). The digital signal values of the respective pixels are stored in the image memory 27. As shown in FIG. 3A, the hatched portions are stored as "0" (black dots) and the blank regions are stored as "1" (white dots) in the image memory 27.

The stored pixel data on the pattern shown in FIG. 3A are sequentially obliquely read out at an angle $\theta_1$ along a broken line $C_1$ running, for instance, from address $A_1$ to address $B_1$ and are input to the image recognition apparatus 28. The read out pixel data are added to calculate an addition sum value $S_1$ by the image recognition apparatus 28.

After completion of the reading operation of the pixel data up to address $B_1$, address $A_1$ is increment to address $A'_1$ by +1, the angle is held at $\theta_1$ and the broken line $C_1$ is shifted in the lateral direction. The pixel data are then successively read out along the broken line $C_1$ from address $A'_1$ to address $B'_1$ (not shown). These pixel data are similarly added and an addition sum value $S_2$ is calculated. These operations are repeated over a predetermined range n with respect to the angle $\theta_1$, that is, until address $A_1$ has been incremented n times in the X direction. Thus, addition sum values $S_1$ to $S_n$ with regard to the angle $\theta_1$ are calculated. This is because the striped pattern has a certain width of a stripe.

Further, the foregoing reading and adding operations are repeated n times at another reading angle $\theta_2$ and other addition sum values $S_1$ to $S_n$ are further calculated with respect to the angle $\theta_2$. In other words, the pixel data are read out along a broken line $C_2$ from address $A_1$ to address $B_2$ and the data so read are added. Next, address $A_1$ is incremented n times, the broken line $C_2$ is shifted in the lateral direction, and the reading and adding operations of the pixel data are executed from address $A'_1$ to address $B'_2$ (not shown) and the like.

A range ($\theta_1$ to $\theta_k$) of the reading angle $\theta$ is preset similarly to the range n of read addresses $A_i$.

Further, a read start address is changed to $A_2$ as necessary and the foregoing operations are executed. An example of this state is shown in FIG. 3A by broken lines $C_3$ and $C_4$.

As will be obvious from FIG. 3A, assuming that the total member $S_{100}$ of the white dots 34 in the vertical direction is set at 100 and the total number $S_0$ of the black dots 33 is set at 0, the addition sum values $S_1$, $S_2$, $S_3$ and $S_4$ calculated along the broken lines $C_1$, $C_2$, $C_3$ and $C_4$ are follows:

$0 < S_1 < 100$
$S_2 = 0$
$0 < S_3 < 100$
$S_4 = 100$

It will be understood that the angle $\theta_2$ corresponded with the angle $\phi$ of a stripe on the striped pattern 32.

Therefore, by performing a statistical process in respect of the foregoing addition sum values gained by the image recognition apparatus 28, the following discriminating processes can be executed.

(1) When the angle $\theta$ of the straight line C to be scanned is equal to the angle $\phi$ of the lines of the striped pattern 32, the maximum value of the addition sum values S becomes a maximum.

(2) When the angle $\theta$ of the straight line C to be scanned is equal to the angle $\phi$ of the lines of the striped pattern 32, the minimum value of the addition sum values S becomes minimum.

(3) When the angle $\theta$ of the straight line C to be scanned is equal to the angle $\phi$ of the lines of the striped pattern 32, the range of the addition sum values S becomes maximum.

These discriminating processes allow the existence of the striped pattern 32 to be recognized and the angle of the striped pattern 32 to be detected.

Figure 5:
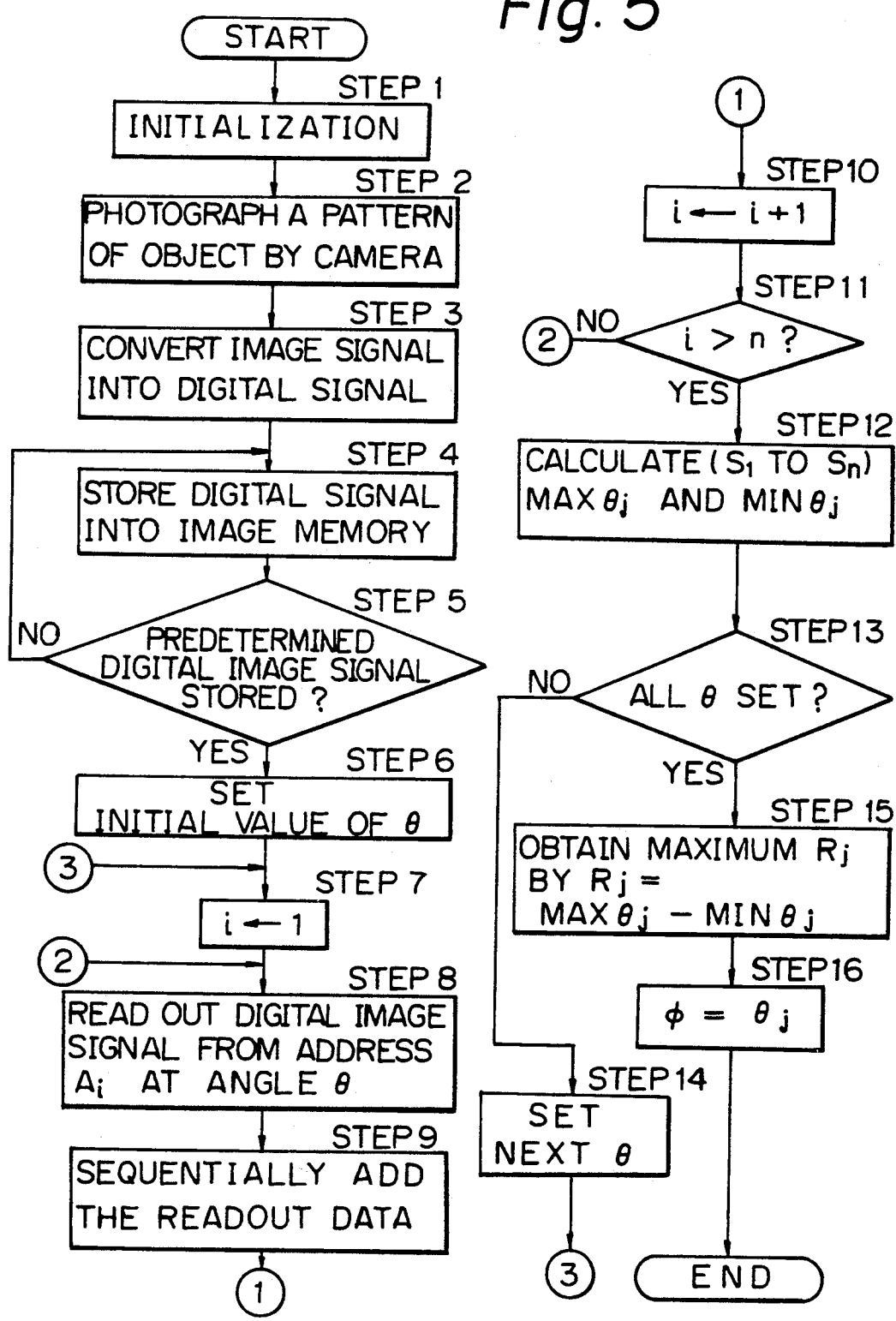
FIG. 5 is a flowchart explaining the operation of the apparatus of FIG. 2.

The foregoing procedure will be described in further detail below with reference to the flowchart in FIG. 5. A range of reading angle $\theta$, a shift range n of read addresses, and a read range (indicated by addresses $B_1$ and $B_2$ or the like in the case of FIG. 3A) in the Y direction are initialized (step 1). Next, the cloth 15 is photographed by the camera 22 and the resultant image data is digitized, the pixel data being stored in the image memory 27 (steps 2 to 5). In this state, the reading angle $\theta$ is set to $\theta_1$ and read address $A_i$ is set to $A_1$ (steps 6 and 7). Then, the pixel data are sequentially read out from read address $A_1$ along the reading angle $\theta_1$ and the pixel data read out are sequentially added to obtain the addition sum value $S_1$ (steps 8 and 9).

At this time, the addresses for reading out the pixel data along the angle $\theta_1$ are calculated by the control unit 29 and output to the image memory 27.

After completion of the process in step 9, read address $A_1$ is incremented by +1 (step 10). The foregoing processes in steps 8 and 9 are executed from incremented read address $A'_1$ to read address $B'_1$, thereby calculating the second addition sum value $S_2$ at the angle $\theta_1$ (steps 10, 11, 8 and 9). This processing loop is repeated n times until read address $A_1$ has been incremented to the initial value n and the addition sum values $S_1$ to $S_n$ at the reading angle $\theta_1$ have been calculated.

After read address $A_i$ has been incremented n times (YES in step 11), the maximum value Max$\theta_1$ and minimum value Min$\theta_1$ of the addition sum values S at the reading angle $\theta_1$ are calculated by the image recognition apparatus 28 (step 12).

Next, the reading angle $\theta$ is changed and the foregoing operations are executed at the changed reading angle $\theta$ (NO in step 13, and steps 14, 7, 8, 9, 10, 11 and 12). Thus, the addition sum values $S_1$ to $S_n$ at each reading angle $\theta$ are calculated by the image recognition apparatus 28. After completion of the reading and adding operations of the pixel data regarding all of the initialized reading angles $\theta$ (YES in step 13), the difference between the maximum and minimum values of the addition sum values at each reading angle $\theta$ is calculated and a reading angle $\theta_j$ which this difference has the maximum value is determined to be the angle $\phi$ of the striped pattern (steps 15 and 16).

The angle $\phi$ of the striped pattern 32 obtained as explained above and the position (X) where the pattern exists are output to the control unit 29 and are also output to the motors 18 and 20 of the cloth position correcting apparatus 16 shown in FIG. 1, thereby correcting the position of the cloth 15. At the same time the corrected position is displayed by the display unit 31. In the case of a continuous pattern along the line OP as shown in FIG. 3A, it has a brightness value (luminance waveform) as shown in FIG. 3B. The dynamic range (the difference between the bright portion and the dark portion) of the luminance waveform incremented by $\theta = \phi$ is improved as shown in FIG. 3C. The possibility of mistaken recognition is thus eliminated and at least the position of the pattern can be calculated.

In this manner, according to the pattern matching apparatus in the embodiment of the invention, the cloth 15 put on the cloth position correcting device is photographed by the camera 22. In the image recognition apparatus 28, the stored digital image data are sequentially added along the lines $C_n$ of several predetermined different angles $\theta$ from a few addresses $A_i$. These addition sum values $S_i$ are respectively compared with the sums $S_1$ to $S_n$. In this way the angle of the striped pattern 32 can be detected and the position of the cloth 15 can be corrected. Thereafter, the cloth 15 can be put on the holding and fixing device 25 in the correct position, and working efficiency is high.

OTHER EMBODIMENTS

Figure 6:
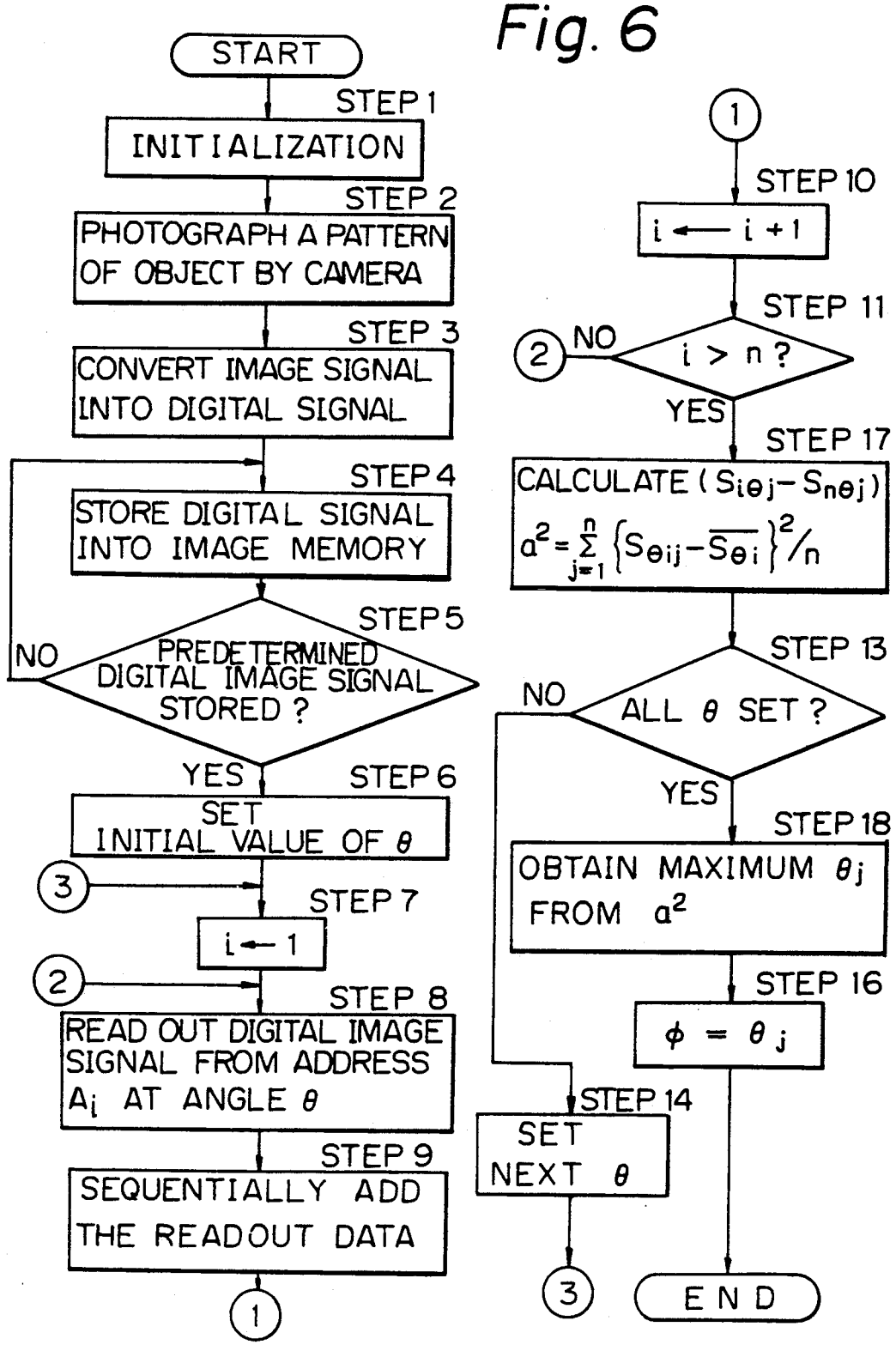
FIG. 6 is a flowchart explaining the operation in another embodiment.

Apart from the primary statistical amounts such as maximum value, minimum value, range, and the like, the angle $\theta$ can also be calculated on the basis of the secondary statistic amounts (unbiased estimate of population variance, standard deviation, residual sum of squares, etc.) in which the variance is set to represent the addition sum values $S_1$ to $S_n$ mentioned above:

$$a^2 = \sum_{i=1}^{n} (S_i - \overline{S})^2/n$$

$$\overline{S} = \sum_{i=1}^{n} S_i/n$$

where,
- $a^2$: degree of variation (in brightness) when calculating the variance of the addition sum values $S_0$ to $S_n$
- $\overline{S}$: mean value of each of the addition sum values $S_1$ to $S_n$ Therefore, when the variance at a certain angle $\theta$ is greater than that at other angles, this angle can be considered to be the angle of the continuous pattern. FIG. 6 shows a flowchart. This flowchart is similar to the flowchart in FIG. 5 except that steps 12 and 15 in FIG. 5 are replaced with steps 17 and 18.

Figures 7A, 7B:
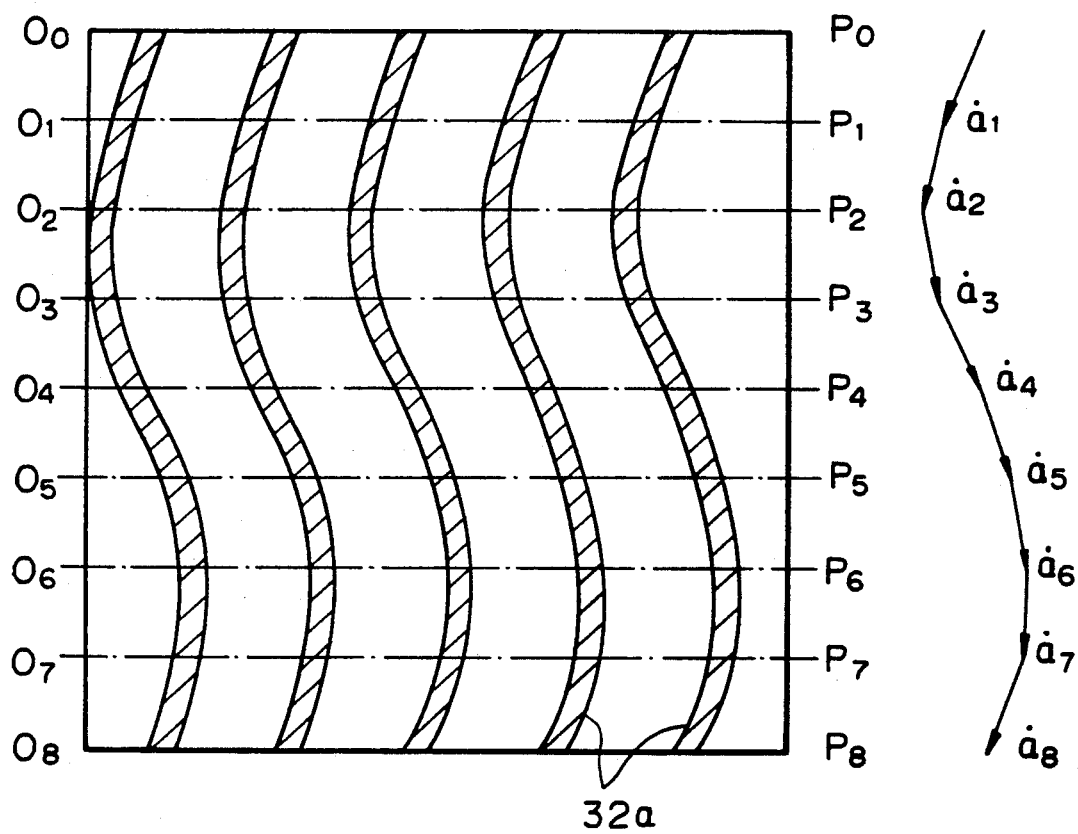
FIG. 7A is a diagram illustrating a deformed zigzag pattern.
FIG. 7B is a diagram showing a locus of the zigzag pattern in FIG. 7A.

The embodiment has been described with respect to a method of detecting the angle and position of the inclined pattern (pattern with little irregularity) 32 of the object (cloth) 15. However, even in the case of an irregular pattern such as the sinuous or undulating (herein "zigzag") pattern 32a which is smoothly rounded along its length, as shown in FIG. 7A, the irregularity, angle and position of the pattern can also be detected by using the foregoing method. That is, in FIG. 7A, the direction (angle) of the pattern between the lines $O_0$-$P_0$ and $O_1$-$P_1$ is detected and expressed by a vector $\vec{a}_1$. The direction (angle) of the pattern between the line $O_1$-$P_1$ and the line $O_2$-$P_2$ is detected and expressed by a vector $\vec{a}_2$. In this manner, vectors $\vec{a}_i$ are successively detected. Finally, the direction (angle) of the pattern between the line $O_7$-$P_7$ and the line $O_8$-$P_8$ is detected and expressed by a vector $\vec{a}_8$. In this way, the vectors $\vec{a}_1$ to $\vec{a}_8$ indicative of the angles of the pattern between the lines are detected. As shown in FIG. 7B, a locus of the irregular pattern is detected by connecting those directions. By tracing the irregularities of the pattern in this manner, the angle and position of the whole pattern can be detected.

In order to detect the pattern between respective lateral lines, read start address $A_i$ and addresses indicative of the reading range in the Y direction are set on each lateral line. The pixel data are read out between these addresses, i.e., the respective lateral lines, and the pixel data read out area calculated in a manner similar to that described above in relation to FIGS. 5 and 6.

Figure 8A:
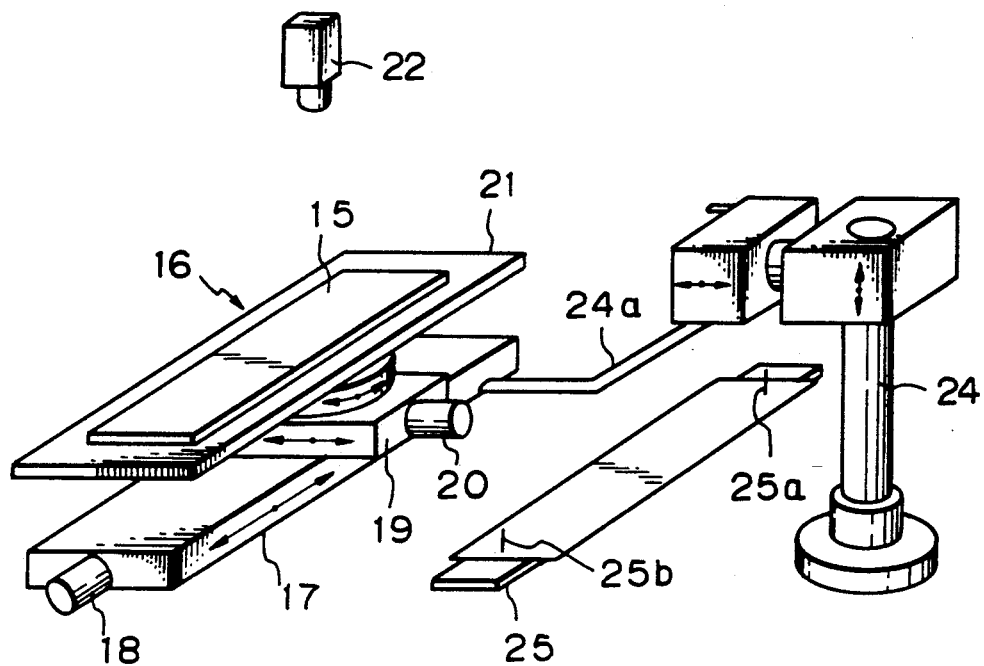
FIGS. 8A to 8F are diagrams showing other embodiments of the pattern matching apparatus shown in FIG. 1, respectively.

FIGS. 8A to 8F show other embodiments of the pattern matching apparatus shown in FIG. 1, respectively. In FIGS. 8A to 8F, parts and components which are the same as those shown in FIG. 1 are designated by the same reference numerals. Referring to FIG. 8A, when a plurality of roughly cut cloth pieces 15 are put on the mounting base 21 of the cloth position correcting apparatus 16, a striped pattern of the top one of these cloth pieces 15 is photographed by the camera 22. The correcting device 19 is moved by the motor 20 so that the striped pattern is always set to assume the same angle of inclination and the same position, thereby correcting the position of the cloth 15. After the position of the cloth 15 has been corrected in this manner, this cloth is conveyed by the arm 24a of the cloth holding and carrying apparatus 24 using a suction-type process. This cloth is then pierced by the pins 25a and 25b and put onto the holding and fixing device 25. These operations are then repeated in a manner similar to the above.

Figure 8B:
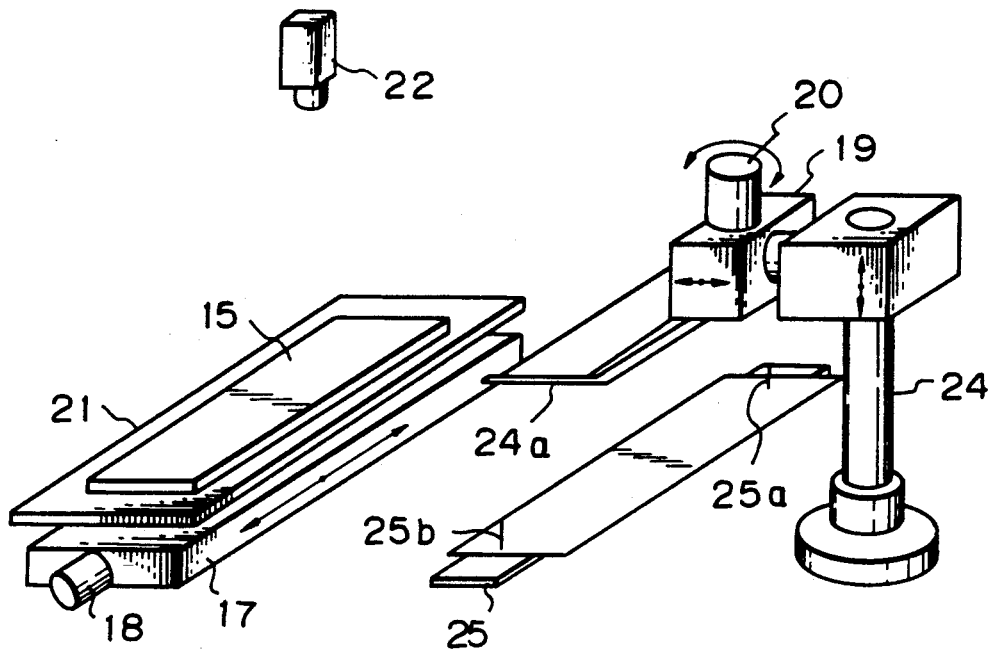

In FIG. 8B, when a plurality of roughly cut cloth pieces 15 are put on the mounting base 21 which is disposed on the fixing base plate 17, the striped pattern of the top one of these cloth pieces 15 is photographed by the camera 22. Thereafter, this cloth 15 is carried by the arm 24a of the cloth holding and carrying apparatus 24. In the cloth holding and carrying apparatus 24, the position of the cloth 15 is corrected by the motor 20 of the correcting device 19 so that the striped pattern of the cloth 15 is always set to assume the same angle of inclination and the same position. Thereafter, the cloth 15 is pierced by the pins 25a and 25b and put onto the holding and fixing device 25. These operations are repeated in a manner similar to the above.

Figure 8C:
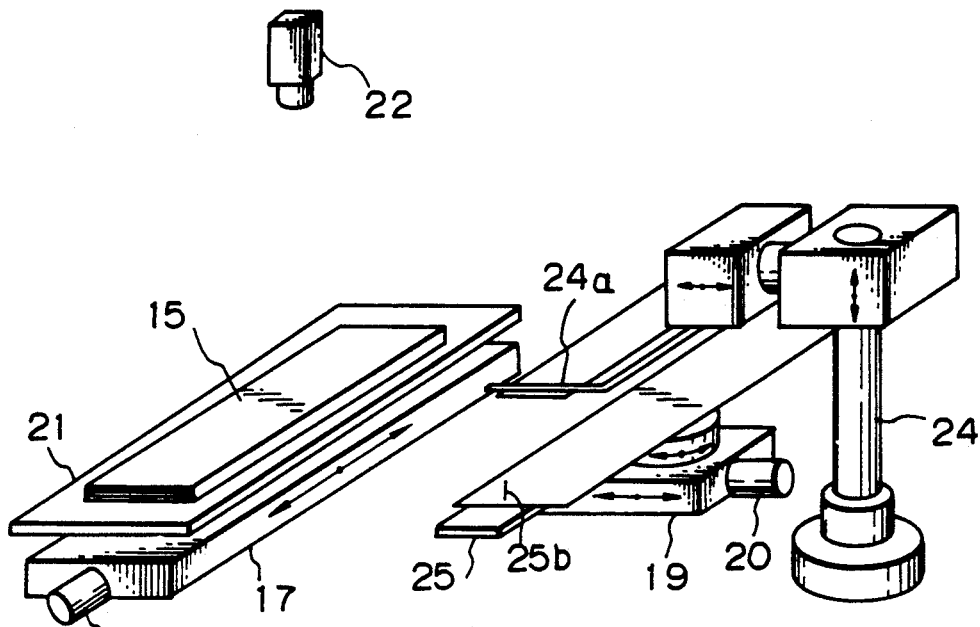

In FIG. 8C, when a plurality of roughly cut cloth pieces 15 are put on the mounting base 21 provided on the fixing base plate 17, the striped pattern of the top one of the cloth 15 is photographed by the camera 22. Thereafter, in the holding and fixing device 25, the position of the cloth 15 is corrected by the motor 20 of the correcting device 19 so that the striped pattern of the cloth 15 is always set at the same angle of inclination and in the same position. This cloth 15 is then carried by the arm 24a of the cloth holding and carrying apparatus 24. Thereafter, the cloth is pierced by the pins 25a and 25b and put onto the holding and fixing device 25. These operations are repeated in a manner similar to the above.

Figure 8E:
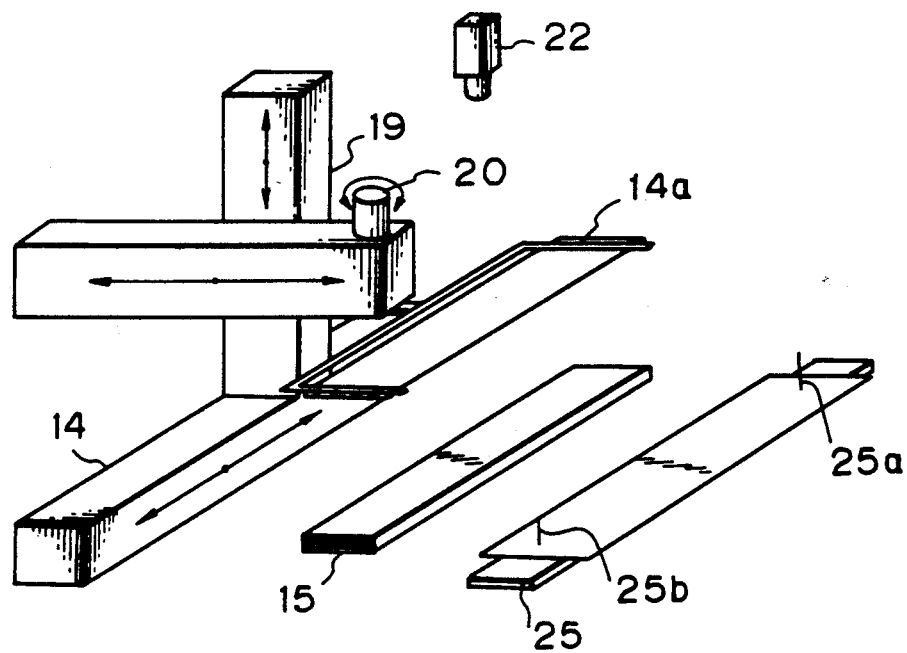
Figure 8D:
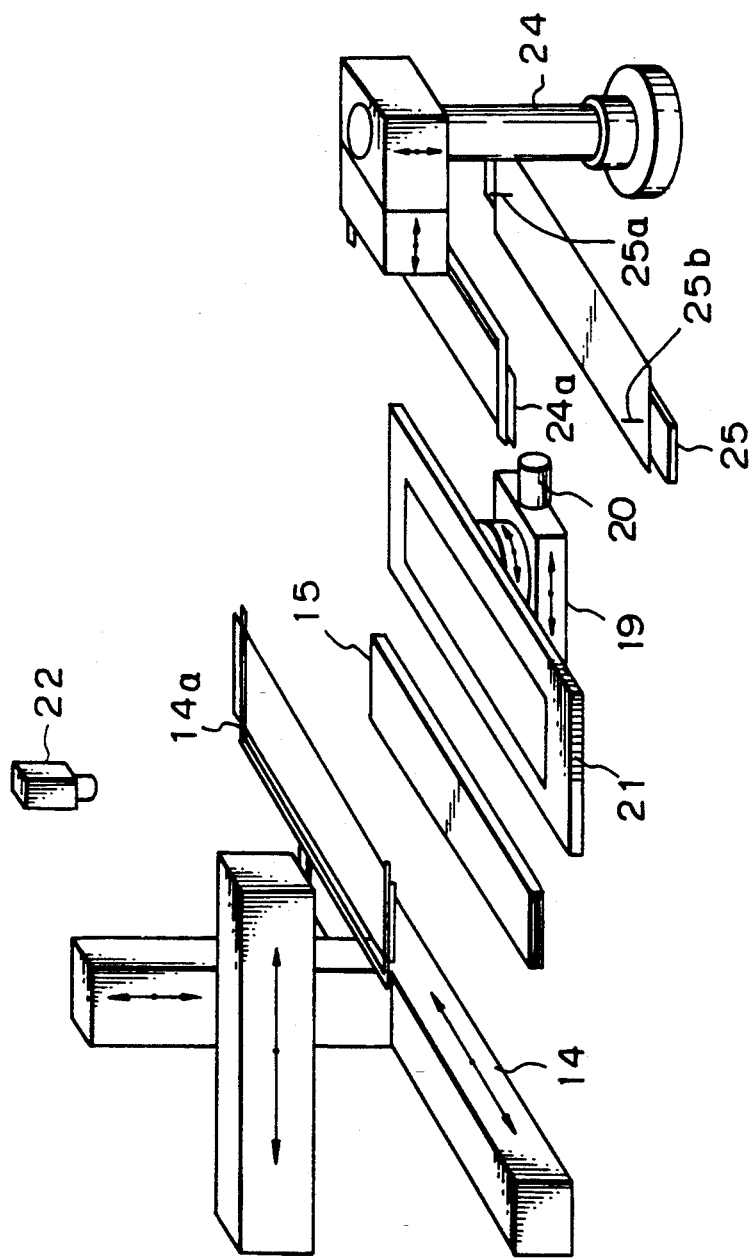

In FIG. 8D, a plurality of roughly cut cloth pieces 15 are held one by one by the arm 14a of the cloth holding and carrying apparatus 14. The striped pattern of each cloth is photographed by the camera 22 provided over the cloth holding and carrying apparatus 14. Thereafter, the cloth 15 is put onto the mounting base 21. The position of the cloth 15 is corrected by the motor 20 of the correcting device 19 so that the striped pattern of the cloth 15 is always set at the same angle of inclination and in the same position. Subsequently, this cloth is carried by the arm 24a of the cloth holding and carrying apparatus 24, pierced by the pins 25a and 25b and put onto the holding and fixing device 25. These operations are repeated in a manner similar to the above.

In FIG. 8E, a plurality of roughly cut cloth pieces 15 are held one by one by the arm 14a of the cloth holding and carrying apparatus 14. The striped pattern of cloth is photographed by the camera 22 provided over the cloth holding and carrying apparatus 14. Thereafter, the position of the cloth is corrected by the motor 20 of the correcting device 19 so that the striped pattern of the cloth 15 is always set at the same angle of inclination and in the same position. Subsequently, the cloth is carried by the arm 14a of the cloth holding and carrying apparatus 14 and this cloth is then pierced by the pins 25a and 25b and put onto the holding and fixing device 25. These operations are repeated in a manner similar to the above.

Figure 8F:
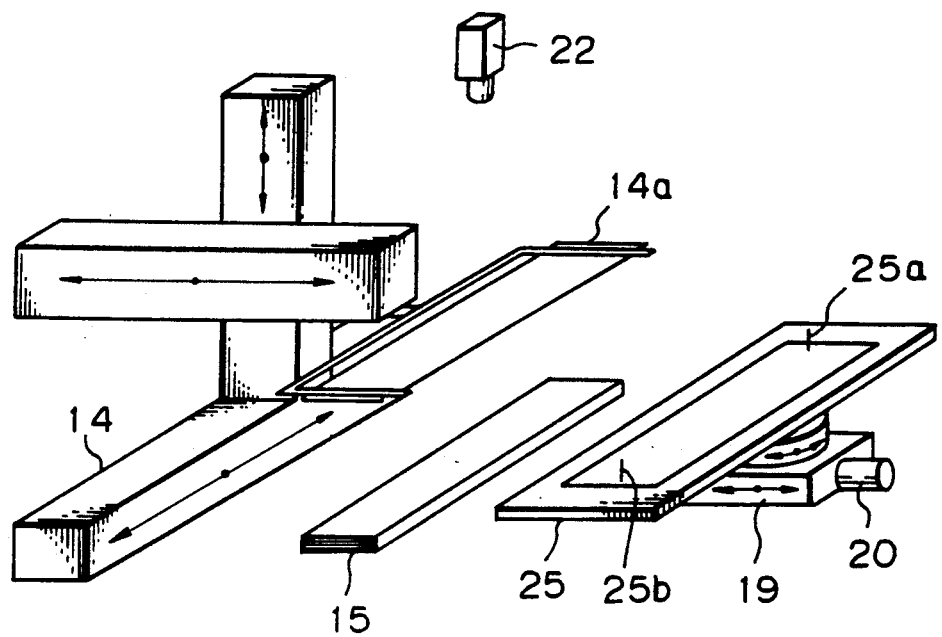
Figure 9A:
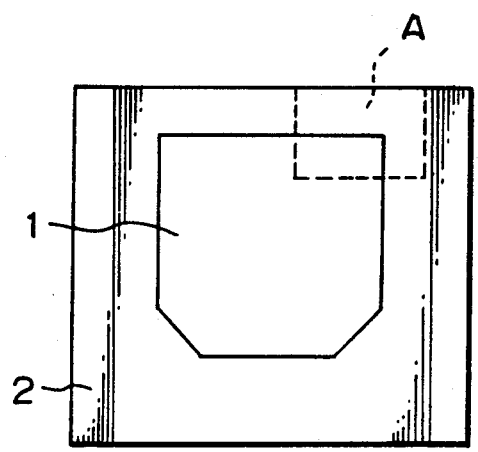
FIG. 9A is a plan view showing a part of the body of a garment to which a pocket is attached.
Figure 9B:
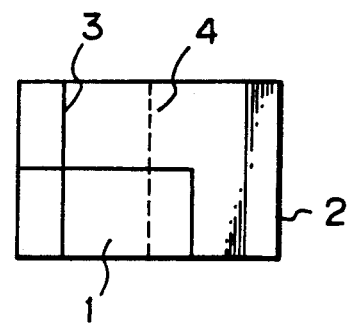
FIG. 9B is an enlarged diagram of the portion surrounded by a broken line in FIG. 9A.
Figure 10:
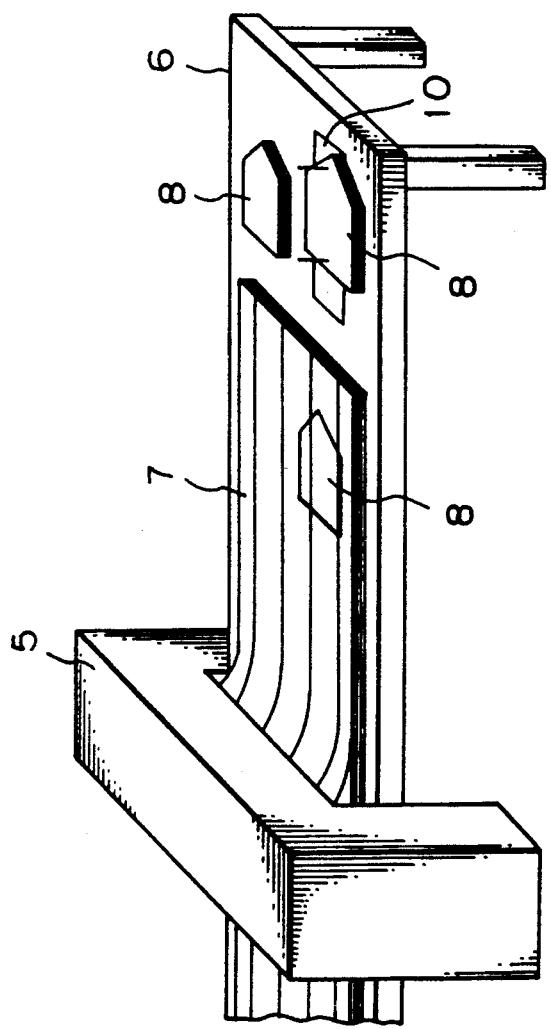
FIG. 10 is a perspective view of a conventional extending and smoothing apparatus.
Figure 11A:
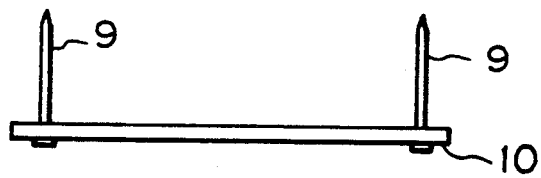
FIG. 11A is a side elevational view of a pin sticking plate which is used in the extending and smoothing apparatus shown in FIG. 10.
Figure 11B:
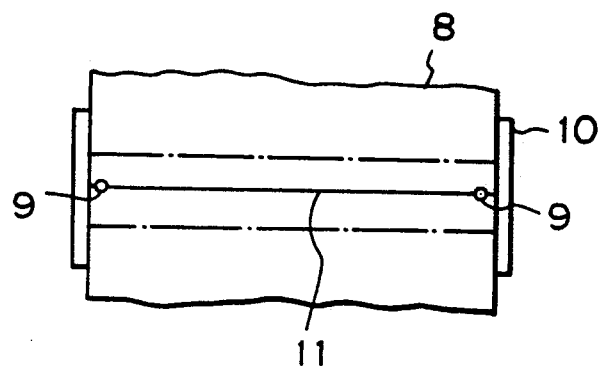
FIG. 11B is a plan view in which cloth pieces are pierced by the pin sticking plate in FIG. 11A.
Figure 11C:
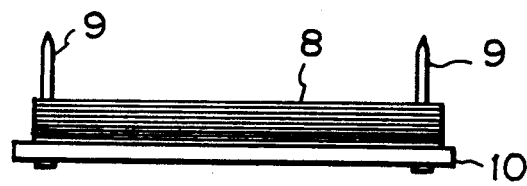
FIG. 11C is a side elevational view of the pin sticking plate in FIG. 11B.
Figure 12:
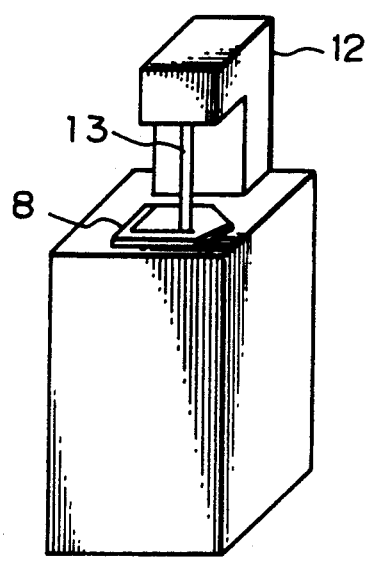
FIG. 12 is a perspective view of a fine-cutting apparatus.

In FIG. 8F, a plurality of roughly cut pieces of cloth 15 are held one by one by the arm 14a of the cloth holding and carrying apparatus 14 using suction. The striped pattern of each cloth is photographed by the camera 22 provided over the cloth holding and carrying apparatus 14. Thereafter, in the holding and fixing device 25, the position of the cloth is corrected by the motor 20 of the correcting device 19 so that the striped pattern of the cloth 15 is always set at the same angle of inclination and in the same position. Subsequently, the cloth is carried by the arm 14a of the cloth holding and carrying apparatus 14 and this cloth is then pierced by the pins 25a and 25b and put onto the holding and fixing device 25. These operations are repeated in a manner similar to the above.

As will be understood from the above description, according to the present invention, blocked cloth pieces each having striped pattern are photographed one by one by the camera, and the resultant analog image signal is converted into digital image data by the A/D converter and stored in the image memory. The stored image data are sequentially read out along several predetermined different angles from address $A_i$ at a predetermined position in the image memory. The image data read out in this way are then added. By comparing the addition sum values S with a plurality of other product sum values, the angle and position of a stripe of the striped pattern can be detected from the angle $\theta$ when a unique addition sum value S which is quite different from the other ones is detected. The position of the cloth is corrected by driving the motor of the cloth position correcting apparatus on the basis of the correction values for angle and position. Thereafter, the corrected cloth is put onto the holding and fixing device. This process offers the advantage that the correcting processes of the cloth can be automatically realized without needing any manual operations.

The present invention is not limited to the foregoing embodiments but many modifications and variations are possible within the spirit and scope of the appended claims of the invention.

What is claimed is:

1. A pattern processing system comprising:
   means for photographing an internal pattern inherent to at least a part of a piece of cloth having an outline, with the pattern located within the outline and comprising a plurality of spaced lines;
   an image memory for storing image data obtained by said photographing means as digital pixel data indicative of luminance;
   read address control means for sequentially designating addresses to read out said digital pixel data stored in said image memory from a read start address in the direction of a Y coordinate along each of a plurality of different reading angles; and
   recognition means for sequentially reading out the digital pixel data for every reading angle in accordance with the address indicated by said read address control means and for detecting the existing position and angle of the lines of said pattern on the basis of a plurality of maximum and minimum values which represent the results of addition obtained by successively adding said digital pixel data read out from said image memory.

2. A pattern processing system comprising:
   means for photographing an internal pattern inherent to at least a part of a piece of cloth having an outline, with the pattern located within the outline and comprising a plurality of spaced lines;
   an image memory for storing image data obtained by said photographing means as digital pixel data indicative of luminance;
   read address control means for sequentially designating addresses to read out said digital pixel data stored in said image memory from a read start address in the direction of a Y coordinate along each of a plurality of different reading angles; and
   recognition means for sequentially reading out the digital pixel data for every reading angle in accordance with the addresses indicated by said read address control means, for successively adding said digital pixel data read out by the recognition means, for obtaining a variance for a mean value of a plurality of addition data at every angle which have been added together, and for detecting the existing position and the angle of said pattern on the basis of the maximum value of said variance.

3. A pattern processing system comprising:
   means for photographing an internal pattern inherent to at least a part of a piece of cloth having a curved line pattern and an outline, with the pattern located within the outline and comprising a plurality of spaced lines;
   an image memory for storing image data obtained by said photographing means as digital pixel data;
   read address control means for sequentially designating addresses to read out said digital pixel data stored in said image memory from a read start address in the direction of a Y coordinate along each of different reading angles for every reading area derived by dividing said image memory into a plurality of reading areas at regular intervals in the direction of the Y coordinate; and
   recognition means for detecting the existing position and the angle of said curved pattern on the basis of maximum and minimum values of a plurality of results of addition obtained by successively adding digital pixel data read out by sequentially reading out the digital pixel data for every one of said reading angles in accordance with the addresses indicated by said read address control means for every one of said reading areas or on the basis of a maximum value of a variance for a mean value of a plurality of additional data at every angle which are derived by said addition.

4. A pattern processing system comprising:
- a mounting base on which roughly cut pieces of cloth are piled;
- a pattern recognition section having means for photographing an internal pattern inherent to at least a part of a piece of cloth having an outline, with the pattern located within the outline and comprising a plurality of spaced lines;
- an image memory for storing image data obtained by said photographing means as digital pixel data indicative of luminance, read address control means for sequentially designating addresses to read out said digital pixel data stored in said image memory from a read start address in the direction of a Y coordinate along each of a plurality of different reading angles, and recognition means for sequentially reading out the digital pixel data for every reading angle in accordance with the addresses indicated by said read address control means and for detecting the existing position and angle of said pattern on the basis of a plurality of maximum and minimum values as the results of addition obtained by successively adding said digital pixel data read out by said recognition means;
- correcting means for moving the mounting base so as to correct the position of said piece of cloth such that the existing position and angle of said pattern recognized by said pattern recognition section are always set at the same position and angle for each of a plurality of said pieces of cloth; and
- fixing and holding means for holding each of the pieces of cloth in a state in which the angle and position of the pattern have been corrected by said correcting means.

5. A pattern processing system comprising:
- a mounting base on which roughly cut pieces of cloth are piled;
- a pattern recognition section having means for photographing an internal pattern inherent to at least a part of a piece of cloth having an outline, with the pattern located within the outline and comprising a plurality of spaced lines;
- an image memory for storing image data obtained by said photographing means as digital pixel data indicative of luminance, read address control means for sequentially designating addresses to read out said digital pixel data stored in said image memory from a read start address in the direction of a Y coordinate along each of a plurality of different reading angles, and recognition means for sequentially reading out the digital pixel data for every angle in accordance with the addresses indicated by said read address control means, for successively adding said digital pixel data read out by said recognition means, for obtaining a variance for a mean value of a plurality of addition data at every angle which have been added, and for detecting the existing position and the angle of said pattern on the basis of the maximum value of said variance;
- correcting means for moving the mounting base so as to correct the position of said pieces of cloth such that the existing position and angle of said pattern recognized by said pattern recognition section are always set at the same position and angle for each of the pieces of cloth; and
- fixing and holding means for holding each of the pieces of cloth in a state in which the angle and position of the pattern have been corrected by said correcting means.

6. A pattern processing system comprising:
- a mounting base on which roughly cut pieces of cloth are piled;
- a pattern recognition section having means for photographing an internal curved line pattern inherent to at least a part of a piece of cloth having an outline, with the pattern located within the outline and comprising a plurality of curved lines;
- an image memory for storing image data obtained by said photographing means as digital pixel data indicative of luminance, read address control means for sequentially designating addresses to read out said digital pixel data stored in said image memory from a read start address in the direction of a Y coordinate along each of different reading angles for every reading area derived by dividing said image memory into a plurality of reading areas at regular intervals in the direction of the Y coordinate, and recognition means for detecting the existing position and the angle of said curved pattern on the basis of maximum and minimum values which represent the results of addition obtained by successively adding the digital pixel data which are read out by sequentially reading out the digital pixel data for every said reading angle in accordance with the addresses indicated by said read address control means for every said reading area;
- correcting means for moving the mounting base so as to correct the position of said pieces of cloth such that the existing position and angle of said pattern recognized by said pattern recognizing section are always set at the same position and angle for each of the pieces of cloth; and
- fixing and holding means for holding each of the pieces of cloth in a state in which the angle and position of the pattern have been corrected by said correcting means.

7. In an automated system for processing patterns inherent to at least part of a piece of cloth, a method of determining the position and angle of lines within the pattern, comprising:
- producing an image of the pattern;
- converting the produced image into a plurality of digital pixels, each digital pixel being indicative of the luminance of a corresponding portion of the produced image;
- storing each of the digital pixels in a storage means;
- reading from the storage means the digital pixels stored in the storage means from a read start address in the direction of a Y coordinate along each of a plurality of different reading angles; and
- detecting the position and angle of the lines of the pattern on the basis of a plurality of results of addition obtained by successively adding the digital pixels read out from the storage means.

8. A method in accordance with claim 7 wherein the detecting step comprises:
- calculating a sum of the digital pixels read from the storage means along each of the plurality of reading angles;
- calculating a variance for each of the plurality of sums of digital pixels calculated in the preceding step; and
- detecting the position and angle of the lines of the pattern on the basis of maximum value of variance.

* * * * *